US005429153A

United States Patent [19]

Squirrell

[11] Patent Number: 5,429,153

[45] Date of Patent: Jul. 4, 1995

[54] HYDRAULIC ACTUATOR FOR ISOLATORS

[75] Inventor: Anton F. Squirrell, Mellingen, Switzerland

[73] Assignee: WES Technology Inc., Santa Ana, Calif.

[21] Appl. No.: 39,473

[22] PCT Filed: Oct. 25, 1991

[86] PCT No.: PCT/GB91/01876

§ 371 Date: May 18, 1993

§ 102(e) Date: May 18, 1993

[87] PCT Pub. No.: WO92/08056

PCT Pub. Date: May 14, 1992

[30] Foreign Application Priority Data

Oct. 26, 1990 [GB] United Kingdom ................ 9023322

[51] Int. Cl.[6] .............................................. F16K 35/00

[52] U.S. Cl. ...................................... 137/385; 251/31; 251/58; 251/279

[58] Field of Search ........................... 251/58, 279, 31; 137/385

[56] References Cited

U.S. PATENT DOCUMENTS

| | | | |
|---|---|---|---|
| 1,678,700 | 7/1928 | McEwan | 251/31 |
| 2,149,725 | 3/1939 | Canaris | 251/31 |
| 2,532,153 | 11/1950 | Drescher et al. | 251/31 |
| 2,954,754 | 10/1960 | Flick | 251/58 |
| 3,237,916 | 3/1966 | Bryant | 251/58 |
| 3,765,438 | 10/1973 | Di Sciascio | 251/58 |
| 4,202,527 | 5/1980 | Price et al. | 251/279 |
| 4,570,900 | 2/1986 | Lonardi et al. | 251/279 |
| 4,690,168 | 9/1987 | Kihm | 251/279 |
| 4,821,998 | 4/1989 | Legille et al. | 251/279 |
| 5,109,883 | 5/1992 | Squirrell | 137/385 |

FOREIGN PATENT DOCUMENTS

| | | |
|---|---|---|
| 984346 | 5/1963 | United Kingdom . |
| WO89/11612 | 11/1989 | WIPO . |

*Primary Examiner*—A. Michael Chambers
*Attorney, Agent, or Firm*—Norbert P. Holler; Gottlieb, Rackman & Reisman

[57] ABSTRACT

A hydraulic actuator for an isolator, comprising a casing (1) having a flange (1*a*) to be mounted to the isolator to be driven, a lever arm assembly (2) connected at each end thereof to a respective one of a pair of identical double acting cylindrical rams (3), the other ends of the rams being respectively connected to opposite ends of the casing remote from the flange, wherein the identical rams are arranged to operate in opposite directions, the radial load exerted by one ram being equal in magnitude but opposite in direction to the radial load exerted by the other ram.

4 Claims, 2 Drawing Sheets

HYDRAULIC ACTUATOR FOR ISOLATORS

Figure 1:
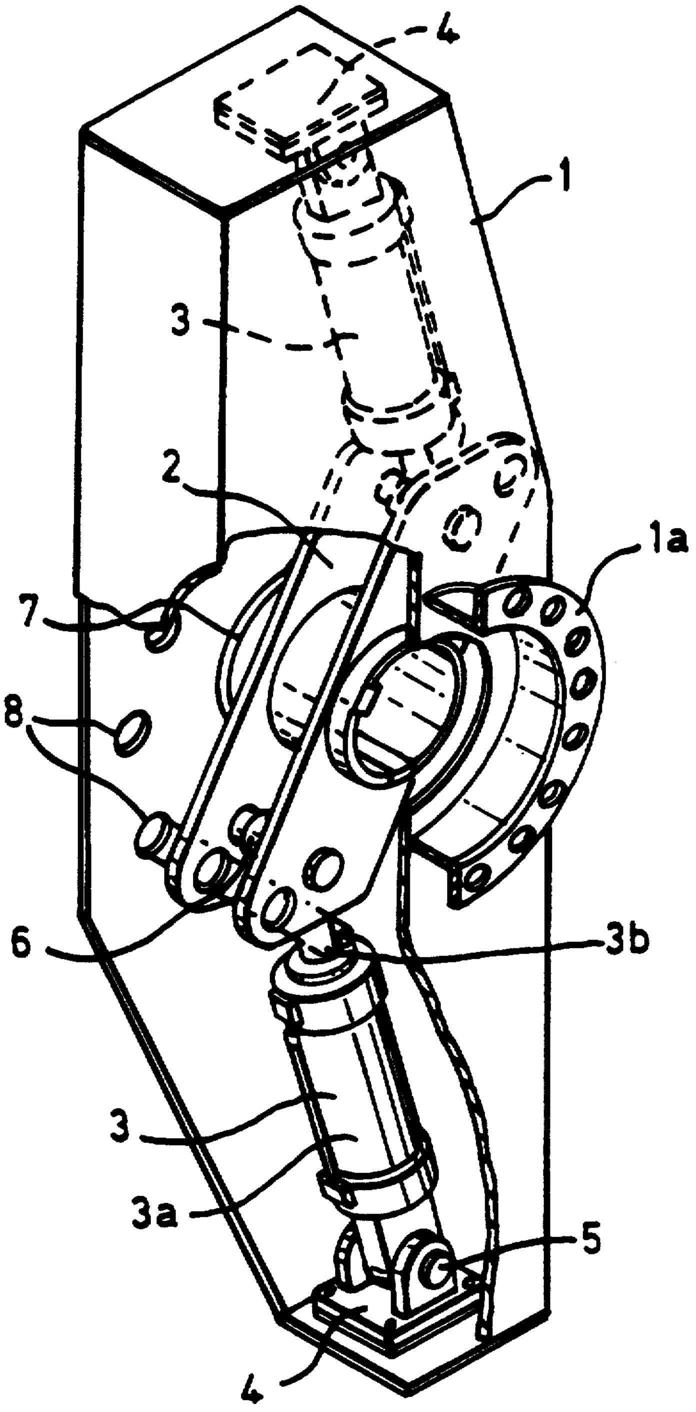

This invention relates to a hydraulic actuator for isolators, in particular for diverter valves or flap isolators (herein both referred to as isolators) used for isolating gases under severe operating conditions of high temperature and/or high pressure.

For many diverter valve or flap isolator applications it is necessary or desirable to use hydraulic actuation systems.

Conventional hydraulic actuation systems usually consist of a hydraulic ram operating a lever which is connected to a shaft to be rotated, to which a valve closure plate is attached. The base end of the ram is pin jointed to an anchor bracket which is normally fixed to some point on the damper or isolator frame. The disadvantage of this arrangement is that differences in temperature between the isolator frame (hot) and the hydraulic ram (cold) causes the effective length of the ram link system and hence the position of the blade to change.

PCT patent application no. PCT/GB89/00593 (publication no. WO 89/11612), corresponding to U.S. Pat. No. 5,109,883 describes and claims an improved hydraulic actuator for overcoming such disadvantages. Specifically, the invention disclosed in WO 89/11612 provides a hydraulic actuator for an isolator, comprising a hydraulic ram one end of which is connected to a lever which is in turn connected to a shaft for a valve plate or other closure, the actuator having a casing which flange mounts on the isolator, and the other end of the said ram being attached to the end of the casing remote from the said flange.

The increasing size of gas turbines creates the need for larger diverter valves for directing the flow of products of combustion to boiler or by pass for combined cycle plant. Larger diverter valves require greater torque. One method of providing this torque is by means of the hydraulic actuator which is the subject of the above-mentioned WO 89/11612.

The operating thrust for this particular actuator is provided by a single hydraulic ram. By the very nature of this arrangement the ram not only transmits the desired torque, but imposes on the overhung shaft a bending moment and also a corresponding radial load upon the bearing.

The present invention overcomes these latter two disadvantages, by providing according to the invention two identical rams operating in opposite directions, wherein the radial laod exerted by the one ram is equal in magnitude but opposite in direction to the other.

Thus the present invention provides a hydraulic actuator for an isolator, comprising a casing having a flange to be mounted to the isolator to be driven, a lever arm assembly connected at each end thereof to a respective one of a pair of identical double acting cylindrical rams, the other ends of the said rams being respectively connected to opposite ends of the casing remote from the said flange, wherein the said identical rams are arranged to operate in opposite directions, the radial load exerted by one ram being equal in magnitude but opposite in direction to the other ram.

The alignment of rams and actuating arm is such that the thrusts for a given direction of rotation are equal and opposite, thus eliminating the bending moment on the shaft.

The general construction of the actuator of the present invention is preferably similar to that described and shown in WO 89/11612 but arranged to house two rams. Any of the features of the actuator described and shown in WO/11612 may be utilized in the present invention, either per se or in an appropriately modified form, for example as follows:

a base end of each hydraulic ram is pin jointed to a respective anchor bracket mounted onto a respective end of the casing remote from the flange;

a rod end of each hydraulic ram is pin jointed to a double ended lever arm which at its center is connected to the isolator shaft;

the hydraulic actuator further comprises a coupling for converting uneven motion of a main shaft to rotary motion of an auxiliary shaft;

more specifically, a tube member is fixed onto the actuator body and on the outside of which bearings are fitted, a tubular auxiliary shaft for driving one or more auxiliary devices is rotatable on said bearings, and a universal joint is located at the interior of the tube member for driving the auxiliary shaft from the main shaft and;

the actuator further comprises a circular locking pin with an eccentric sleeve for locking an isolator closure member.

In order to obviate detailed descriptions and illustrations of the foregoing features to the greatest extent possible, the relevant disclosures of U.S. Pat. No. 5,109,883 which pertain on the one hand to the coupling (including the tube member and bearings and the auxiliary shaft and universal joint) as shown in FIGS. *3a*, *3b* and *3c* of that patent, and on the other hand to the locking pin and eccentric sleeve as shown in FIGS. *4a* and *4b* of that patent, are incorporated in the present application by this reference as if fully set forth herein.

The invention in another aspect provides an isolator, which preferably comprises an isolator shaft; an isolator closure member carried by the isolator shaft; a hydraulic actuator for the isolator shaft; an auxiliary shaft for driving at least one auxiliary device such as a limit switch, a deceleration valve or a position transmitter, in response to operation of the isolator shaft; and a coupling interconnecting the isolator shaft and the auxiliary shaft for converting any possibly uneven motion of the former to a true rotary motion of the latter;

(a) the hydraulic actuator comprising a casing having first and second end regions and accommodating a part of the isolator shaft intermediate the end regions, the casing having an exterior mounting flange for connecting the casing to the isolator and at each of the first and second end regions thereof having an interior mounting bracket, a double ended lever arm assembly located within the casing and drivingly connected at its center to the isolator shaft, and a pair of identical hydraulic rams located within the casing and each having a base end and a rod end, the base end of each ram being pin jointed to the respective mounting bracket and the rod end of each ram being pin jointed to a respective end of the lever arm assembly, wherein the two identical rams are arranged to operate in opposite directions, the radial load exerted by one ram being equal in magnitude but opposite in direction to the other ram;

(b) the auxiliary shaft comprising a rotatable tubular body equipped on its exterior with at least one operating element for driving at least one auxiliary device; and (c) the coupling comprising a tube member fixed onto the isolator, a plurality of bearings fitted onto the exterior of the tube member, the tube member extending axially into the tubular body of the auxiliary shaft and rotatably supporting the same by means of the bearings, and a universal joint located interiorly of the tube member and drivingly interconnecting the isolator shaft and the auxiliary shaft.

As already mentioned, the disclosures of U.S. Pat. No. 5,109,883 pertaining to the features mentioned in paragraphs (b) and (c) above are fully incorporated herein by reference and hence require no detailed illustration or description.

The isolator may further comprise means for locking the isolator closure member in any selected one of three operational positions, the locking means comprising a locking pin of circular cross-section supported by the casing, and an eccentric sleeve rotatably supported by the locking pin in a position to selectively clear, obstruct fully or obstruct partially any displacement of the lever arm assembly by the hydraulic ram. The disclosures of U.S. Pat. No. 5,109,883 pertaining to these features are, as already mentioned, also fully incorporated herein by reference and require no detailed illustration or description.

Figure 2A:
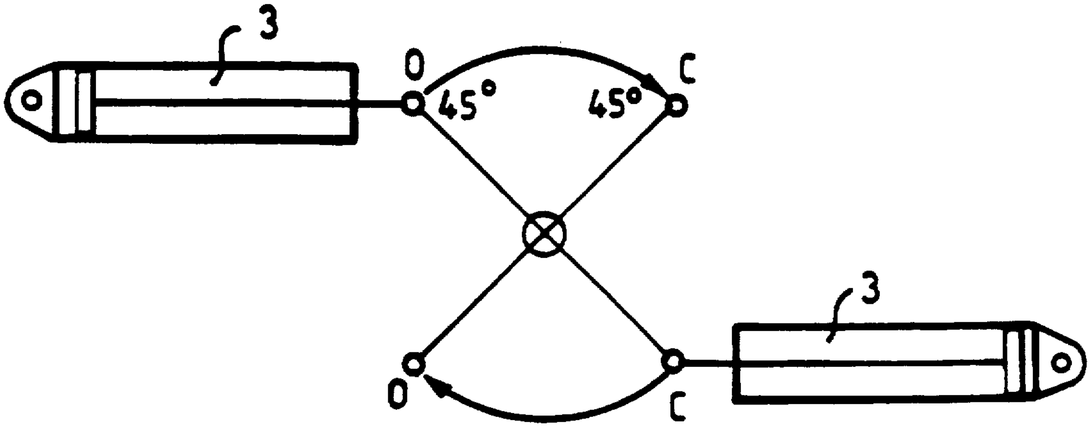
Figure 2B:
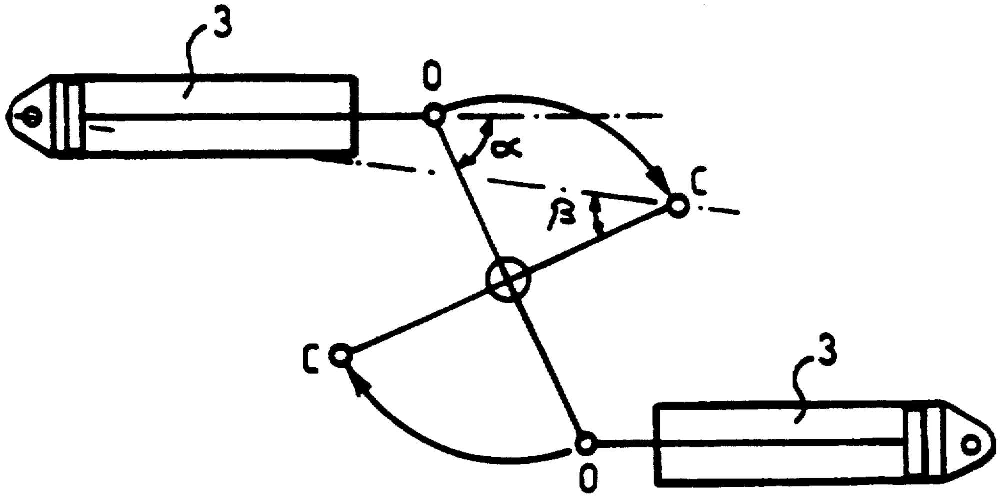

The invention will be further described, by way of example only, with reference to the accompanying drawings, in which:

FIG. 1 is a perspective view, partly cut away, of one embodiment of a hydraulic actuator according to the present invention; and FIGS. 2*a* and 2*b* illustrate two alternative arrangements of the alignment of rams and actuator arm in the hydraulic actuator of the invention.

FIG. 1 shows a hydraulic actuator which comprises a casing 1, a flange 1*a* of which is to be mounted to the isolator to be driven. A double ended lever arm assembly 2 is connected at each end thereof to the rod end of a respective one of a pair of double acting hydraulic rams 3, each comprising a cylinder 3*a* and a rod 3*b*. The other end (the base end) of each ram 3 is connected to an anchor bracket 4.

The brackets 4 are mounted onto the opposite ends of the casing 1 remote from the flange 1*a*. Each ram 3 is pivotably connected to its respective anchor bracket 4 by a pin joint 5, and the rod end of the ram is connected to the lever arm assembly 2 by another pin joint 6.

The centre portion of the lever arm assembly 2 is welded to a collar 7 to which is in turn keyed an isolator shaft (not shown) which will carry a flap valve plate (not shown) or other valve closure as appropriate.

Reference numeral 8 indicates a plurality of holes in the casing side walls for providing a like number of different locking pin locations for the means to selectively clear, obstruct fully or obstruct partially any displacement of the lever arm assembly by the hydraulic rams, such means being fully shown in FIGS. 4*a* and 4*b* of U.S. Pat. No. 5,109,883 and incorporated herein by reference.

In operation the rams 3 are hydraulically actuated to pivot the lever arm assembly 2, to open and close the isolator by means of the valve closure carried by the isolator shaft. As mentioned above, by using two identical rams 3 operating in opposite directions, the radial load exerted by the one ram is equal in magnitude but opposite in direction to the other.

FIGS. 2*a* and 2*b* show two alternative arrangements of rams and actuating arm. As can be seen, the thrusts for a given direction of rotation are equal and opposite, thus eliminating the bending moment on the shaft.

I claim:

1. A hydraulic actuator for an isolator, comprising a casing (1) having opposite ends and having a flange (1*a*) intermediate said opposite ends to be mounted to the isolator to be driven, a pair of identical double acting cylindrical rams (3) housed in said casing and each having first and second ends, and a double ended lever arm assembly (2) articulated at each end thereof to a respective one of said first ends of said identical double acting cylindrical rams, said second end of each of said identical rams being respectively articulated to a respective one of said opposite ends of said casing remote from said flange, wherein said identical rams are arranged to operate in opposite directions, the radial load exerted by one ram being equal in magnitude but opposite in direction to the radial load exerted by the other ram.

2. An isolator, which comprises an isolator shaft; an isolator closure member carried by said isolator shaft; and a hydraulic actuator for said isolator shaft; said hydraulic actuator comprising a casing (1) having opposite end regions and accommodating a part of said isolator shaft intermediate said end regions, said casing having an exterior mounting flange (1*a*) connecting said casing to said isolator and at each of said opposite end regions thereof having an interior mounting bracket (4), a double ended lever arm assembly (2) located within said casing and drivingly connected to said isolator shaft, and a pair of identical double acting hydraulic rams (3) located within said casing and each having a base end (3*a*) and a rod end (3*b*), said base end of each ram being pin jointed (5) to a respective one of said mounting brackets and said rod end of each ram being pin jointed (6) to a respective end of said lever arm assembly, wherein said identical rams are arranged to operate in opposite directions, and the radial load exerted by one ram is equal in magnitude but opposite in direction to the radial load exerted by the other ram.

3. An isolator as claimed in claim 2, which further comprises an auxiliary shaft for driving at least one auxiliary device; and a coupling interconnecting said isolator shaft and said auxiliary shaft for converting any possibly uneven motion of the former to a true rotary motion of the latter; said auxiliary shaft comprising a rotatable tubular body equipped on its exterior with at least one operating element for driving said at least one auxiliary device; and said coupling comprising a tube member fixed onto the isolator, a plurality of bearings fitted onto the exterior of said tube member, said tube member extending axially into said tubular body of said auxiliary shaft and rotatably supporting the same by means of said bearings, and a universal joint located interior of said tube member and drivingly interconnecting said isolator shaft and said auxiliary shaft.

4. An isolator as claimed in claim 2 or 3, which further comprises means for locking said isolator closure member in any selected one of three operational positions, said locking means comprising a locking pin of circular cross-section supported by said casing, and an eccentric sleeve rotatably supported by said locking pin in a position to selectively clear, obstruct fully or obstruct partially any displacement of said lever arm assembly by said hydraulic rams.

* * * * *